United States Patent

Snyder

[15] 3,664,126
[45] May 23, 1972

[54] VALVELESS HYDRAULIC CONTROL

[72] Inventor: James H. Snyder, Battle Creek, Mich.
[73] Assignee: Clark Equipment Company
[22] Filed: Nov. 27, 1970
[21] Appl. No.: 93,349

[52] U.S. Cl. .......................................... 60/52 HD, 60/52 R
[51] Int. Cl. ........................................................ F15b 15/18
[58] Field of Search ................................... 60/52 HD, 52 R

[56] References Cited

UNITED STATES PATENTS

| 1,835,979 | 12/1931 | Ernst et al. | 60/52 R |
| 2,042,247 | 5/1936 | Blood | 60/52 R |
| 2,119,902 | 6/1938 | Blood | 60/52 R |
| 2,359,112 | 9/1944 | Hymans | 60/52 HD X |
| 2,768,500 | 10/1956 | Tyler | 60/53 R X |

Primary Examiner—Edgar W. Geoghegan
Attorney—Kenneth C. Witt, John C. Wiessler, Robert H. Johnson and Lewis J. Lamm

[57] ABSTRACT

A valveless control apparatus for hydraulic equipment having a pump and two hydraulic motors all of equal capacity in which the selective braking of the motors controls the flow of fluid to and from the hydraulic equipment without the use of any valves.

10 Claims, 1 Drawing Figure

PATENTED MAY 23 1972 3,664,126
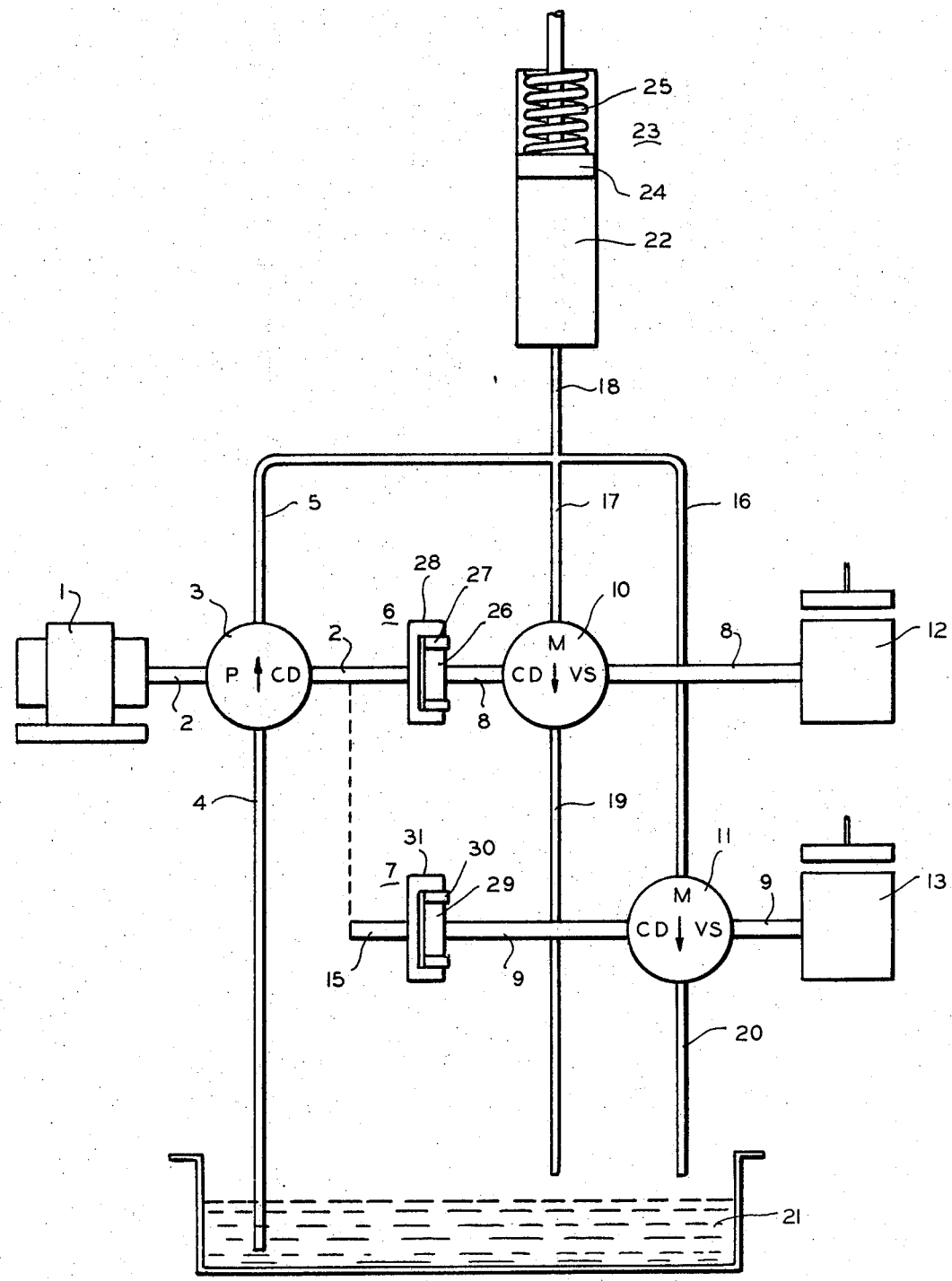
INVENTOR
JAMES H. SNYDER
BY
Lewis J. Lamm
ATTORNEY

VALVELESS HYDRAULIC CONTROL

BACKGROUND AND SUMMARY OF THE INVENTION

This invention relates to hydraulic control apparatus for controlling the flow of fluid in and out of a hydraulic member, for example a cylinder which actuates an elevator.

The present invention has a positive displacement hydraulic pump and two positive displacement hydraulic motors, all having equal displacement per revolution of its associated shaft. The output of the pump, and the input of both motors are connected to the hydraulic cylinder to be controlled. Each of the motors has a brake attached thereto and the selective actuation of one or both of these brakes causes the combined capacity of the motors to equal, be greater than, or less than, that of the capacity of the pump whereby the fluid in the hydraulic cylinder is either diminished, held constant or increased to thereby lower, hold or raise the elevator.

In the present invention, each of the hydraulic motors is connected to the pump by an overrunning clutch whereby the flow of fluid through the associated motor may equal, but not exceed the output of the pump.

When one brake is locked preventing any fluid from flowing through one of the motors, the flow of fluid through the other motor just equals the output of the pump and the elevator remains stationary.

When both brakes are off, the combined flow of fluid through the motors is limited by the overrunning clutches to exactly twice the output of the pump with the difference between the output of the pump and this combined flow through the motors being made up by the fluid flowing out of the hydraulic equipment being controlled. When both hydraulic motors are held stationary by the brakes, the entire output of the pump flows into the hydraulic equipment being controlled.

By controlling the application of the brakes, the combined flow of fluid through the motors may be made to vary from zero to twice the capacity of the pump thereby controlling the flow of fluid from a rate into the hydraulic mechanism at a rate equal to the capacity of pump to a rate out of the mechanism equal to the capacity of the pump.

Representative of the closest known prior art is the following reference material:

U.S. Pat. No. 2,042,247 — Blood discloses a machine tool actuated by hydraulic members driven by hydraulic pumps.

U.S. Pat. No. 2,119,902 — Blood discloses a machine tool transmission and control mechanism for the hydraulic control of the machine tool.

The present invention permits the hydraulic actuation and control of a load supporting piston without the use of valves and their resulting throttling effect.

In the present invention, the rate of discharge of fluid through each of the hydraulic motors is limited to the rate of discharge of fluid by the pump. Should the rate of discharge of fluid through either of the motors with the brake fully applied to the other motor tend to exceed the fluid discharge of the pump, the associated overrunning clutch will cause the hydraulic motor to drive the pump at a higher speed, and thus increases the hydraulic fluid discharge so the rate of fluid displacement by the pump and the motor remains equal.

It is, therefore, an object of the present invention to provide a control for a hydraulic mechanism without the use of valves.

It is another object of the present invention to provide a control system for a hydraulic mechanism which permits the hydraulic pump to be run at a constant speed and the actuation of the hydraulic member to be controlled by the braking of hydraulic motors.

It is a further object of the present invention to provide a control system for hydraulic member utilizing a constant delivery pump and two motors each having the same displacement per revolution as that of the pump.

Further objects of the present invention will become apparent from inspection of the drawing, the specification and will be pointed out in the claims.

Referring to the lone drawing FIGURE, a control system embodying the present invention is illustrated.

BRIEF DESCRIPTION OF PREFERRED EMBODIMENT

In this system the motor 1 drives the hydraulic pump 3 and overrunning clutch members 28 and 31 at the same speed and direction. The hydraulic motors 10 and 11 each have the same displacement per revolution as the pump 3. The motor 10 rotates in the same direction as the pump 3 and is connected to the pump 3 by overrunning clutch 6 so that the motor 10 can run at speeds less than or just equal to the speed of rotation of the pump 3, but never exceed that speed.

In a similar manner, the motor 11 rotates in the same direction as the pump 3 and is connected thereto through overrunning clutch 7 so that its speed and resulting hydraulic fluid displacement rate can equal, but never exceed the output of the pump 3. As brakes 12 and 13 are applied, the fluid through the motors 10 and 11 is restricted and when the total flow through these two motors is less than the output of the pump 3, the excess hydraulic fluid enters the chamber 22 of the hydraulic member 23. Conversely, when the brakes 12 and 13 are released sufficiently to allow this combined flow of fluid through the motors 10 and 11 to exceed the output of the pump 3, hydraulic fluid is exhausted from the hydraulic member 23 to make up this difference in fluid flow. In this way the piston 24 may be raised and lowered by the actuation of the brakes 12 and 13.

SPECIFIC DESCRIPTION OF THE PREFERRED EMBODIMENT

Referring now to the drawing, 1 is a drive device preferably an electric motor of the constant speed type having a drive shaft 2. Element 3 is a rotary constant displacement pump of any well known type. This pump has a constant fluid displacement per revolution. Element 6 is a one-way clutch which allows the outer member 28 to overrun the inner member 26 as a result of the one-way torque transmitting roller or cam member 27. Element 7 is an overrunning one-way clutch similar to 6 with an overrunning outer member 31, an inner member 29 and one-way torque transmitting roller or cam members 30. Overrunning clutches 6 and 7 may be any commonly used one-way clutches which are suitable for the purpose.

Elements 10 and 11 are both variable speed constant displacement hydraulic motors each having the same hydraulic displacement per revolution as does the pump 3. Elements 12 and 13 are brakes of the common type capable of supplying varying amounts of braking force to the shafts 8 and 9, respectively. The brakes may be completely released to allow the shafts to run freely or may be applied as desired to slow the shaft down until it is completely stopped. Element 23 is a hydraulic system to be controlled, here schematically shown as a piston type with a cylinder cavity or chamber 22, a piston 24, and a spring 25 of sufficient force to keep the hydraulic fluid in the cylinder 22 under pressure.

The shaft 2 is directly connected to drive the pump 3 and the overrunning element 28 of the one-way clutch 6 so that they all rotate at the same speed. The shaft 2 is connected to the shaft 15 in a one-to-one ratio and the shaft 15 is rigidly connected to the overrunning element 31 of the one-way clutch 7. The shaft 8 is driven by the hydraulic motor 10 and connects the hydraulic motor, the brake 12 and the underrunning element 26 of the one-way clutch 6 rigidly together. In like manner, the shaft 9 is driven by the hydraulic motor 11 and connects the brake 13 and the underrunning element 29 of the one-way clutch 7 rigidly together. Element 21 is a hydraulic sump having a suction conduit 4 in communication with the intake of the pump 3. Element 5 is an exhaust conduit from pump 3 and is in communication with the conduits or supply lines 16, 17 and 18. Line 18 is in communication with cylinder 22, line 16 is in communication with an inlet port of the motor 11 and line 17 is in communication with an inlet port of the motor 10. Elements 19 and 20 are hydraulic exhaust lines from the motors 10 and 11 respectively, back to the sump 21.

OPERATION OF PREFERRED EMBODIMENT

In the preferred embodiment, the electric motor 1 drives the pump 3, the overrunning element 28 and the overrunning element 31 all at constant speed. The brakes 12 and 13 are actuated as desired to control the flow of fluid through the motors 10 and 11 to cause the raising or lowering of the piston 24 with its associated mechanical load.

Operation to Hold Piston 24 at Constant Height

When it is desired to maintain the piston 24 and its associated mechanical load, for example, an elevator, at a constant height, the hydraulic control system must be so operated as to maintain the volume of hydraulic fluid in the cylinder 22 constant. In order to maintain this volume of hydraulic fluid constant, the output of the pump 3 must just equal the amount of fluid allowed to flow back to the sump 21 through motors 10 and 11. Since 10 and 11 each have the identical fluid displacement as the pump 3, one of these motors may be locked to prevent the flow of fluid therethrough and all of the fluid allowed to flow through the other motor. Let us assume that brake 13 is actuated to lock the motor 11 so that no fluid flows in the supply line 16 or 20. Under these conditions, the brake 12 is completely released allowing the motor 10 to run freely. In these circumstances, the motor 10 will accelerate under no load conditions until it reaches a speed where the shaft 8 tries to drive the shaft 2 through the one-way clutch 6. When this clutch is locked up so that the shaft 8 is operating at the same speed as shaft 2 regardless of what this speed may be, the flow of fluid from the output of the pump 3 through the supply line 5 just equals the input of the fluid from the line 17 to the motor 10. Under these conditions, the energy absorbed from the fluid by the motor 10 drives the pump 3 and the only electrical energy absorbed by the motor 1 is that necessary to make up for system energy losses. Therefore, the motor 1 is running under substantially no load conditions with a minimum of electrical energy being used.

Operation to Raise the Piston 24

When it is desired to raise piston 24 and its associated load, the volume of hydraulic fluid in the cylinder 22 must be increased by the amount required to raise the load at the desired rate. Under these conditions, we leave the brake 13 locked and apply the brake 12 as necessary to get the desired velocity of movement of the piston 24. Under these conditions, the motor 10 is working against the brake 12 and, therefore, the shaft 8 is turning at an angular velocity less than that of shaft 2. Under these conditions, the overrunning element 28 rotates faster than the underrunning element 26 and there is no torque transmitted between the motor 10 and the pump 3. Also under these conditions the flow of fluid allowed to pass from the line 17 to line 19 by the motor 10 is less than that which is being supplied through line 5 by the pump 3. The surplus enters the cylinder 22 through line 18 and this raises the piston 24 at a rate dependent on the difference in fluid flow rate between the line 5 and line 17 which difference appears in line 18. For maximum upward movement the brake 12 is fully applied in the locked position with the brake 13 remaining in the fully applied locked position and under these conditions there is no fluid flowing in the line 16 or line 17 and, therefore, the entire output of the pump 3 enters the cylinder 22 through lines 5 and 18. With the brake 13 in the fully applied locked position the desired rate of travel of the piston 24 in the upper direction may be obtained by controlling the volume of oil flowing through the motor 10 by actuation of the brake 12. It may thus be seen that the piston 24 will move up at a rate from zero to that equivalent to the maximum output of the pump 3, dependent on the degree of the operation of the brake 12.

Operation to Lower Piston 24

When it is desired to lower piston 24, the pump 3 is operated as before and either the brake 12 or brake 13 is entirely released. Assuming that the brake 12 is released and brake 13 is left locked, under these conditions we have the same operation as we had previously for holding the piston 24 in a constant position. Under these conditions as described above in connection with holding the piston 24 in a constant position, the motor 10 accelerates until it is transmitting torque through the one-way clutch 6 to the pump 3 and the motor 1 is carrying very little torque. As the brake 13 is released, the motor 11 allows fluid to flow from line 16 to line 20, an amount dependent upon the speed of rotation of the motor 11. Since the motor 10 and the pump 3 have identical displacements per revolution, the flow of the hydraulic fluid in line 5 just equals the flow of hydraulic fluid in line 17 when the brake 12 is released. Under these conditions, all of the hydraulic fluid flowing through line 16 must come from the cylinder 22 through line 18. The rate of flow of this fluid depends on the magnitude of the braking torque placed on the motor 11 by the brake 13 through shaft 9. If the brake 13 is entirely released, the motor 11 accelerates up to a speed at which the shaft 9 equals the speed of the shaft 15 and also that of the shaft 2. Under these conditions, the pump 3 is driven by motors 10 and 11 and the electric motor 1 starts to overrun, giving dynamic braking. The dynamic braking thus exerted by the motor 1 when it is running at greater than designed speed regulates the speed at which the piston 24 may proceed downwardly when the brakes 12 and 13 are entirely disengaged. This offers a safety device in the event of failure of both brakes 12 and 13.

It may thus be seen that the only time the motor 1 is absorbing any appreciable amount of electrical energy is when the piston 24 and its associated load are being raised. When the load is held at a constant height, the motor 1 generates only that amount of energy necessary to overcome mechanical and hydraulic losses. When the piston 24 and its associated load is transmitting energy to the hydraulic fluid, the electrical motor 1 may overrun and thus give dynamic braking.

It may thus be seen that in the operation of the present invention, a considerable increase in efficiency may be realized by elimination of the throttling effect of valves and by permitting the energy being absorbed by the hydraulic motors to be used to drive the pump and thus save the electrical energy needed to drive this pump under normal conditions.

It may also be seen that due to the pump and the associated motor 1 being driven by the hydraulic motors 10 and 11 when the piston 24 is proceeding downwardly with its associated load that as a result of the electrical motor 1 being driven at greater than designed motor speed, that it gives dynamic braking with resulting safety of operation.

Having thus described the preferred embodiment of the present invention, it will, of course, be understood that various changes may be made in the form, detail and arrangements and proportions of the parts without departing from the scope of the invention which consists of the matter shown and described herein and set forth in the appended claims.

I claim:

1. Hydraulic control apparatus comprising:
    a hydraulic member to be actuated by the ingress and egress of hydraulic fluid,
    a pump of a uniform hydraulic fluid delivery per revolution,
    a drive for said pump,
    a first hydraulic rotary motor having the same hydraulic displacement per revolution as said pump,
    a brake connected to the output shaft of said first hydraulic rotary motor,
    a second hydraulic rotary motor having the same hydraulic displacement per revolution as said pump,
    a second brake connected to the output shaft of said second hydraulic rotary motor,
    a first overrunning clutch,
    a second overrunning clutch,
    said pump connected to said first hydraulic rotary motor and to said second hydraulic rotary motor by said first overrunning clutch and said second overrunning clutch, respectively, so that the rotary speed and resultant hydraulic fluid displacement rate of either of said motors may equal that of said pump, but not exceed it, fluid communication means between the output of said pump, the input of said hydraulic member, the input of said first hydraulic rotary motor, and the input of said second hydraulic rotary motor, whereby the actuation of one of said brakes is capable of stopping one of said motors to thereby permit the flow of hydraulic fluid through the other of said motors to just equal the entire output of said pump so that no fluid is introduced into said hydraulic member, and whereby the actuation of both of said brakes may restrict the flow of fluid through said motors so that there is an excess of hydraulic fluid output from said pump and this excess will flow into said hydraulic member, and whereby the release of said brakes or the partial operation thereof will permit the entire output of said pump plus hydraulic fluid from said hydraulic member to flow through said motors, to thereby permit the control of the movement of said hydraulic member by the actuation of said brakes.

2. Hydraulic control apparatus as claimed in claim 1 in which said drive for said pump is a constant speed drive.

3. Hydraulic control apparatus as claimed in claim 1 in which said hydraulic member includes a piston reciprocal in a cylinder.

4. Hydraulic control apparatus as claimed in claim 1 in which both of said brakes are friction brakes.

5. Hydraulic control apparatus as claimed in claim 1 in which said drive for said pump is an electric motor.

6. Hydraulic control apparatus as claimed in claim 1 in which said drive for said pump is a constant speed electric motor.

7. Hydraulic control apparatus as claimed in claim 2 in which said hydraulic member includes a piston reciprocal in a cylinder.

8. Hydraulic control apparatus as claimed in claim 6 in which said hydraulic member includes a piston reciprocal in a cylinder.

9. Hydraulic control apparatus as claimed in claim 8 in which both of said brakes are friction brakes.

10. Hydraulic control apparatus as claimed in claim 8 in which said piston in said cylinder is spring biased in the direction opposing the force of said hydraulic fluid.

* * * * *